Patented Oct. 14, 1924.

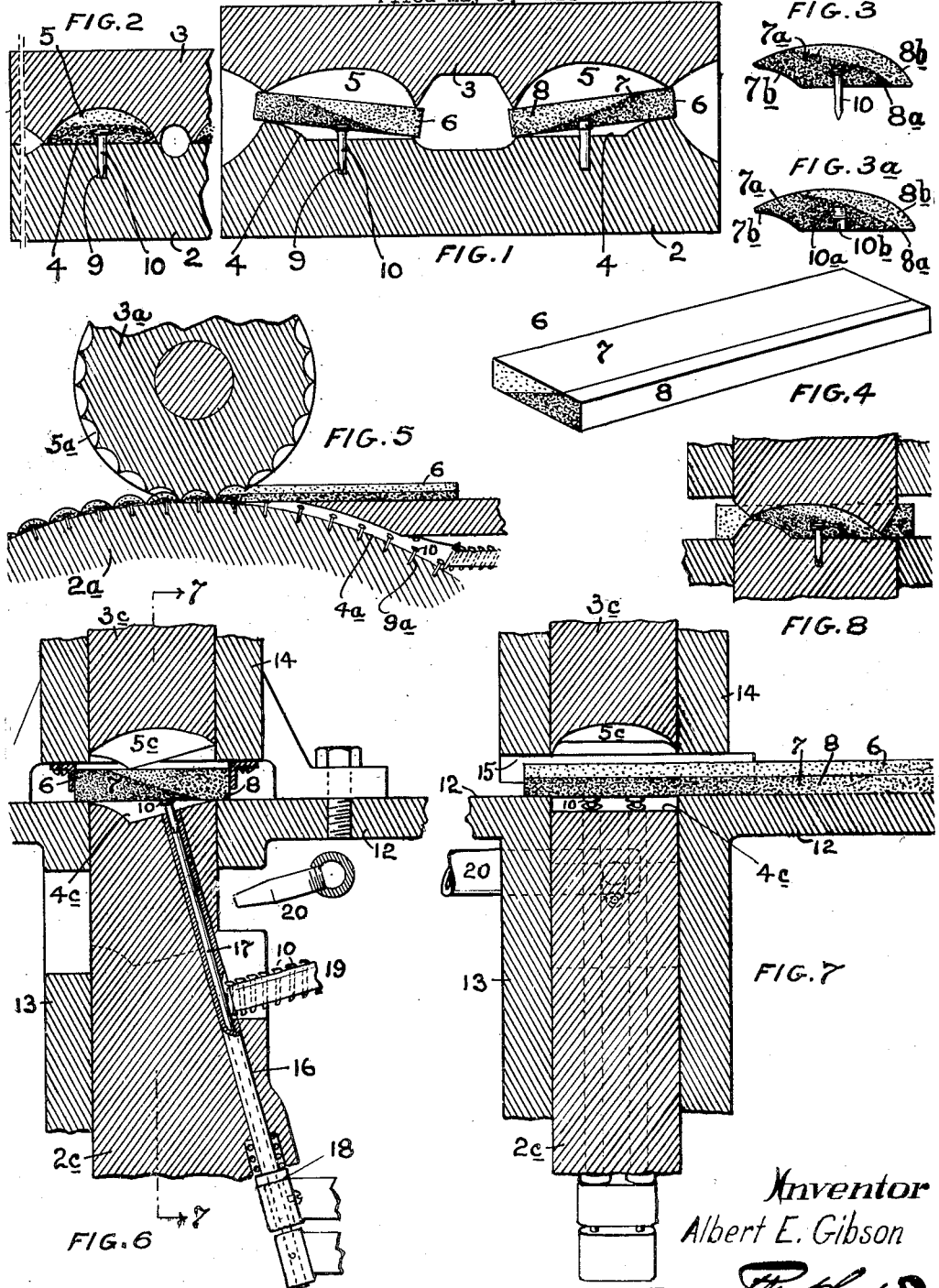

1,511,458

UNITED STATES PATENT OFFICE.

ALBERT E. GIBSON, OF PHILADELPHIA, PENNSYLVANIA, ASSIGNOR TO THE DENTISTS' SUPPLY COMPANY, A CORPORATION OF NEW YORK.

METHOD FOR FORMING MOLDED OBJECTS.

Application filed May 3, 1922. Serial No. 558,069.

*To all whom it may concern:*

Be it known that I, ALBERT E. GIBSON, a citizen of the United States, and resident of Philadelphia, county of Philadelphia, and State of Pennsylvania, have invented an Improvement in Methods for Forming Molded Objects, of which the following is a specification.

My invention has for its object the molding of artificial teeth and other articles in such a manner as to form them of two or more grades of material (such as of different colors) and which, when baked or vitrified, will provide a unitary object with different colors or shades blended to a more or less extent.

In another pending application of mine, Serial Number 537,157, filed February 17th, 1922, I have set out a process and apparatus for securing final results of the same general character as herein contemplated, but in that case the articles were made from mixtures of different materials in powdered or granular form fed into the molds in a loose condition and thereafter compressed to the proper shape and homogeneity in respect to density.

In the present case, the materials are first prepared in the form of sheets or strips in which the different shades or colors are incorporated with a uniformity along the length of the strip, the said strip being preferably slightly plastic and adapted to be subjected to stamping and molding operations, whereby a series of duplicated articles, such as artificial teeth, may be successively stamped from and formed of the said strip material, and wherein each article so formed is composed in its make-up of portions of the differently colored or shaded substance of the strip, said articles being in this respect substantially identical.

My object is further to provide a suitable machine or apparatus for stamping and forming the composite materials in the manner above stated though, in a more broad aspect of the invention, the forming or shaping of the articles, as for instance, artificial teeth, may be performed in the usual molds now employed when subjected to greater pressure than has heretofore been necessary in their use where the molds have been filled with plastic material by hand operation.

Considering the subject of this invention more particularly in respect to the making of artificial teeth, it is necessary to provide a porcelain body portion of relatively darker material than the front and incisor portions which are composed of lighter and more transparent porcelain. Heretofore, the materials composing the light and dark portions of the teeth were first prepared in a more or less pasty condition and then introduced into the mold successively by hand, and subsequently compressed and baked preliminary to the final vitrifying operation. The process, as heretofore carried on, is relatively slow and, moreover, is liable to provide more or less irregularity and dissimilarity in the shading of the teeth when, on the other hand, they should be duplicates of each other.

By my improved process and means I am enabled to mold artificial teeth and other articles in a rapid manner from the previously prepared sheets or strips of the composite light and dark materials and at the same time insure absolute uniformity in the preparation and positions of the light and dark materials in the molding during the operation to secure the different coloring or shading of the article.

By my improved process, the composite strips or sheets may be accurately prepared in a very simple manner and as the mechanical stamping operation is a mere function of the machine requiring no intelligence on the part of the operator, it is manifest that not only may the teeth be rapidly and cheaply produced, but accurate and satisfactory results may be obtained by the employment of unskilled labor. Furthermore, by my improved process, I am enabled to subject the material of which the article is made to great pressure whereby it is so compacted that it is brought to a strong molded shape and may be readily handled for the final fusing or vitrifying operation without the necessity of a preliminary baking operation, as has heretofore been necessary with hand molded teeth before they could be removed from the molds.

With the above and other objects in view, the nature of which will be more fully understood from the description hereinafter, the invention consists in the novel method and construction of apparatus and the article produced thereby, as hereinafter more fully described and defined in the claims.

Referring to the drawings: Fig. 1 is a vertical section through a mold and material to be treated thereby and embodying my invention; Fig. 2 is a transverse section of a portion of the means shown in Fig. 1, when the material has been subjected to pressure; Figs. 3 and 3ª are sectional views through artificial teeth molded by the method and means constituting my invention; Fig. 4 is a perspective view of a strip of the composite material from which the teeth or other articles are stamped and molded; Fig. 5 is a sectional view illustrating a type of machine for rapidly molding the articles from a strip of the character shown in Fig. 4; Fig. 6 is a vertical section of another type of machine adapted for stamping and molding the articles from the composite strip; Fig. 7 is a transverse section taken on line 7—7 of the apparatus shown in Fig. 6; and Fig. 8 is a sectional view with the dies in their completed movement for molding the tooth and showing a modified form of apparatus.

Primarily, it is essential that the composite strip 6 be provided for employment with the various molding means shown, and a simple construction of the said strip is illustrated in Fig. 4 and comprises two longitudinal overlapping strips 7 and 8, each of which is a trapezoid in cross section and with the oblique faces of the strips contacting and preferably uniting so that the entire composite strip 6 is of an integral structure. The strip is made up of porcelain material, such as employed in the manufacture of artificial teeth and is essentially composed of feldspar with more or less coloring matter and a slight admixture of a suitable binder sufficient to hold the feldspar in definite form both in the bar shape and when stamped up into the tooth forms preliminary to the ultimate vitrification under high temperature. In the particular construction shown, the material 8 of the strip is relatively lighter than the material 7, the latter being intended to form the main body and back of the tooth but blending into the lighter material 8 at what constitutes the upper or root end of the tooth, whereas the lighter material 8 overlaps the darker material 7 to constitute the lighter and more transparent portion of the incisor end of the tooth as well as a large portion of the frontal surface, as will be more fully understood by explanations hereinafter to be given. For convenient employment in connection with stamping or pressing dies, it is desirable that the composite strip be made sufficiently plastic that it will maintain its continuity while being stamped in the dies when forming the tooth forms.

In the simplest exposition of my invention, I have shown in Fig. 1 the usual form of dies constituting the mold, this comprising a lower body 2 having formed therein a plurality of tooth recesses 4 and an upper body portion 3 having corresponding recessed portions 5 which, when the two parts 2 and 3 are fully assembled, coact with the parts 4 to provide complete tooth shaped cavities. Heretofore, these cavities have been filled with the feldspar material by hand and then the mold parts placed together for shaping the porcelain material into the tooth forms. It is manifest, however, that in such operations the introduction of the material was more or less irregularly done due to hand manipulation and consequently, the teeth produced were not all uniform in character as to coloring or shaping. Furthermore, when the mold recesses were filled by hand operations, the bisk in the complete molded form was not compressed to the desired extent and consequently the shrinkage upon vitrification was always considerable, amounting usually to about one-fifth of the linear dimension of the tooth. By my improved method of making the artificial tooth forms, the compression employed is very great and consequently the shrinkages in the vitrified teeth is much less and the strength of the tooth is correspondingly increased, so that the final product by my improved process is greatly improved over what was possible under the former practice.

In employing the ordinary mold parts 2 and 3 shown in Fig. 1 for use with my improved method, I may place the composite strips 6 between the two mold parts 2 and 3, and more particularly, interposed between the tooth mold parts 4 and 5 and thereafter force the mold body parts 2 and 3 together, with the result that portions of the strips 6 are caused to fill the tooth form spaces between the said parts 4 and 5, giving to the material the tooth shape desired. In this operation, the body part 3, in effect, acts as a die to stamp from the strip a sufficient quantity thereof to fill the mold parts 4 and 5 when they are finally brought together, as indicated more fully in Fig. 2, and producing thereby the tooth structure shown in Fig. 3. It will be understood, however, that the particular shape of the tooth is a mere result of the particular shape of the recesses 4 and 5 and, therefore, while I have indicated a shape to correspond to the tooth structure of Fig. 3, I do not in any manner restrict myself to the shape of the molding parts, as they may be made of any shape which may be required to produce porcelain teeth of a definite character desired.

By reference to Fig. 1, it will be observed that the overlapping light and dark feldspar materials of the strip are so received in the mold parts 4 and 5 that the dark material fills the larger portion of the recess 4 to constitute the dark body portion 7ª of Fig. 3, whereas the lighter portion 8 of the strip more fully fills the recess 5 of the mold to form the light shade front portion 8ª of the tooth structure and the incisor end 8ᵇ thereof, as indicated in Fig. 3. Furthermore, it will be seen that the root end or that which comes next to the gums, shown at 7ᵇ, is formed of the darker material constituting the body part 7ª. When the biscuited tooth thus molded is subjected to the vitrifying temperature, the feldspars 8ª and 7ª weld into each other and the coloring or shading more or less blends and especially toward the end 7ᵇ where the overlapping of the two materials extends to the front surface. I would further point out that in molds of this character there is provided a recess 9 in the mold part 2 which may receive a pin 10 to be directly molded into the tooth structure, as indicated in Fig. 3, the porcelain material being molded about the upwardly projecting head portion of said pin. Pins of this character are usually employed in facings. If the pin is double headed, as some times employed, then the tooth is adapted for use in plate work in which the exposed head portion would be embedded in the vulcanite. In some types of teeth, the pins are soldered into anchors after the teeth have been completed. In those cases, the anchors are supported upon posts which project upwardly from the recesses 9 in the mold part 2, and the anchors are supported on the ends of the posts so that when the porcelain material is molded over the anchors and subsequently removed from the molds, the anchors remain in the molded tooth, and when the same is vitrified said anchors are firmly in position and form a support for the pins which are subsequently soldered thereto, such method of attaching the pins to anchors by solder being well known, and no further reference to it will be necessary.

Referring to Fig. 5, I have indicated two revolving cylindrical wheels 2ª and 3ª having in their coacting surfaces recessed portions constituting molding or die parts 4ª and 5ª respectively, and between these wheels 2ª and 3ª I feed the composite strip 6 and in that manner mold the tooth forms, as will be readily understood. In a machine of this character, the molding operation may be performed very rapidly and it will also be understood that the different recesses 4ª and 5ª may be variously shaped so that one revolution of the wheel 3ª may mold a complete set of twelve teeth constituting the frontal teeth of the upper and lower jaw.

Referring to Fig. 6, I have shown lower and upper dies 2ᶜ and 3ᶜ respectively, having vertical reciprocating motions in stationary portions 13 and 14 of the main frame. These dies may be reciprocated by any suitable mechanism, as will be understood by one skilled in the art, and have their opposing surfaces 4ᶜ and 5ᶜ so shaped that they cooperate to form a mold space corresponding to the form of tooth to be molded. The main frame 13 is provided with a table portion 12 which is continuous across the dies 2ᶜ and 3ᶜ and a space 6 is provided between the table portion 12 and the portion 14 of the main frame between which the composite strip 6 may be fed in an intermittent manner so that, as it passes between the dies 2ᶜ and 3ᶜ, the latter may be operated to punch from the said strip the material necessary to form the molded tooth structure. The shape of the die portions 4ᶜ and 5ᶜ are such as to produce a tooth form of the general character of Fig. 3. In the operation of these dies, the lower die 2ᶜ may be held stationary while the upper die 3ᶜ is caused to descend stamping from the strip 6 the necessary material to form the molded tooth. When the tooth is thoroughly molded and fully compressed, the lower die descends to the position indicated by dotted lines, whereat the molded tooth form may be removed from the die by a blast of air or otherwise, as may be desired. If the dies are operated in a horizontal direction, it is manifest that the tooth form will drop out from the die when brought to the dotted line position, where it may fall by gravity. I do not limit myself to these details as to the mode of operation in so far as they may relate to the specific form of apparatus. In cases where a pin is to be molded into the tooth, the die part 2ᶜ is provided with an oblique hole 18 in which is guided a tubular plunger 16 having operatively arranged within the same a plunger rod 17. In receiving and introducing a pin into the mold, the tubular plunger 16 and the rod 17 are lowered to a position which enables one of the pins 10 from the race-way 19 to pass into the end of the tubular plunger and thereupon the plunger is raised to the level of the bottom of the mold surface 4ᶜ, as shown in Fig. 6, and the plunger rod 17 then raised to an extent sufficient to raise the pin so that its head extends somewhat into the mold space as in the case of Fig. 1, and while in this position and thus supported the upper die 3ᶜ descends to mold the porcelain material about the said pin, so that the result is similar to that indicated in the operation with the mold parts shown in Fig. 1. However, in this case, the compression of the material is far greater and consequently there will be less shrinkage in the material when it is ultimately vitrified, and, moreover, the tooth structure will be more dense and strong. When the die 2ᶜ is moved down to the dotted position for discharge of the molded tooth form, the latter may be discharged by the rod 17 being driven forward to an extent sufficient to push the pin shank out of the tubular plunger 16. In cases where the molded tooth is to have an anchor instead of a pin, then and in that event, the parts 16, 17 are slightly modified as to adjustment for receiving and introducing an anchor within the mold space. In this case, the rod 17 would project somewhat beyond the tubular plunger 16 to support the anchor and then when the parts are driven upward, the anchor would be introduced into the mold space and supported upon the end of the rod 17 until the molding operation was completed. Thereafter, when the die 2$^c$ is lowered, the plunger 16 would be moved forward to push the molded tooth together with its anchor off the end of the rod 17, thereby leaving the tooth with an anchor in it and a hole leading to the anchor, such as shown in Fig. 3$^a$, in which 10$^a$ is the anchor and 10$^b$ is the hole.

More particularly referring to the preferred materials constituting the composition of the article molded, the same may be composed of feldspar, kaolin and silex, except for the coloring metallic oxides employed in the two parts for providing the desired shades. In the compositions employed for making artificial teeth, the part 8 of the composite strip ordinarily would have little or no coloring matter, whereas the part 7 of said strip would be provided with the necessary oxides to give the darker shade which is to provide the shading for the end of the tooth most distant from the incisor part, namely, that portion which comes adjacent to the gums. In making up the compositions to enter into the production of the strip 6, it will be understood that aside from the mixture of the earthy or mineral matters, there should be mixed with them small quantities of a suitable binder, such as is provided by a solution of gum arabic, sugar water, rosin, wax, dextrine or other equivalent vegetable matter or any mixture of them desired, so that when the materials are mixed and more or less compressed in shaping the strips 7 and 8 or the composite strip as a whole, the materials will maintain their shape with sufficient rigidity to be properly handled and, moreover, to insure the parts 7 and 8 adhering to each other. In commercial practice, it is desirable that the strips be of a more or less ductile form (without being plastic), so that in the action of the die, the tendency is to compress and compact the material during the shaping operation under the influence of the dies without any tendency to brittleness. Subsequently, the materials are subjected to a thorough drying and vitrification.

While I have had in mind more particularly the manufacture of artificial teeth by my improved method and apparatus, it is to be understood that the same process may be employed in the production of cameos, in which case the cross sectional forms of the parts 7 and 8 may be more or less varied. In such cases, the overlapping of the two characters of material 7 and 8 may each be of the full width of the composite strip, such, for example, as providing a dark backing of the full width with a thin surface layer of the lighter material also the full width, the surface of the upper die being shaped or formed to make the proper intaglio or relief impressions. In the case of cameo productions, the vitrification may also be carried out by subsequent treatment to high temperature, and such cameo effects may be utilized either for jewelry or for buttons, etc.

Further considering my invention from a broader standpoint, the overlapping or superimposed material may be of various compositions of a yielding nature and subjected to dies in a similar manner to that hereinbefore described, the only difference being that the substances may be of other than those capable of vitrification, such, for example, as compositions formed of an earthy material mixed with a binder which may be softened by heat sufficient to permit the stamping and shaping of the articles by the dies in rapid succession and wherein the materials treated provide the different layers to insure the variation in shade or coloring effect. While the carrying out of my improved process or method involves the treatment of specially prepared strips of material shown, for example, in Fig. 4, I do not in this application make claim to said strips or composite form of material to be subjected to the forming operations, as the same constitutes subject matter of a divisional application Serial Number 659,072, filed August 24, 1923. Neither do I claim the apparatus herein shown, as said apparatus forms subject matter of a separate application Serial Number 726,684, filed July 18, 1924.

I have described my improved method and means in that particularity which I deem to be the best exposition of my invention, and that which I prefer in commercial practice, but I do not restrict or confine myself to the minor or secondary details, as such are susceptible of modification which may be resorted to as matters of mechanical skill and without a departure from the spirit of the invention.

Having now described my invention, what I claim as new and desire to secure by Letters Patent of the United States, is:

1. The method of shaping objects from a plurality of different materials consisting of simultaneously introducing between a pair of dies a composite strip formed of two previously formed layers in overlapping or superimposed condition and simultaneously subjecting the said composite strip to the action of the dies and thereby stamping the same into proper outline and compressing the different materials into close compacted relation whereby portions of each of the different materials are exposed upon the same surface.

2. The method according to claim 1, further characterized by forming the composite strip from materials capable of vitrification and which during the stamping operation are associated in a yielding from, and subsequently vitrifying the objects formed by the dies by subjecting them to high temperature.

3. The method according to claim 1, wherein the overlapping layers of the materials forming the composite strip comprise materials having different colors and shade characteristics whereby the finished object is formed with different color and shade effects upon one surface.

4. The method according to claim 3, wherein the overlapping portions of the two materials in forming the composite strip so overlap that part of each of the materials are exposed on the same surface and wherein further the object produced with the presence of the materials of different color and shade upon the same surface are subsequently vitrified by heat and the coloring matter caused to blend from one of the materials into the other.

5. The herein described method of rapidly producing articles such as artificial teeth consisting of first preparing a strip of composite material composed of two overlapping layers separated by obliquely arranged surfaces, said materials being held together by a suitable binder and thereafter feeding the strip between dies for rapidly stamping from said material objects in duplicate and wherein each object so formed has its surface composed partly of one of the materials and partly of the other.

6. The method according to claim 5, wherein the materials forming the composite strip are capable of vitrification, and finally subjecting the stamped objects to the action of heat and thereby vitrifying the same.

7. The herein described method of forming objects which consists in simultaneously feeding two overlapping bodies of materials having different shade or color effects between a pair of dies and simultaneously stamping from the overlapping bodies a portion of each and densifying them into a unitary mass of definite configuration and shape partly formed of each of the materials and in which a portion of each of the materials is caused to show upon the same face.

8. The method according to claim 7, wherein further the object formed of the two materials is subsequently subjected to high temperature and thereby vitrified.

9. The herein described method of rapidly forming objects from strips of composite material consisting in first forming a composite strip of two bodies of different materials arranged as overlapping strips in juxtaposition along their length, but in which the strips of different material project laterally in opposite directions relatively to the portions in juxtaposition, and stamping from the composite strip so formed an object having the two materials compressed along its middle portion and having its ends respectively composed of each of the materials separately.

10. The method according to claim 9, further characterized by subjecting the object produced to high temperature for vitrification.

In testimony of which invention, I hereunto set my hand.

ALBERT E. GIBSON.